United States Patent
Coutu et al.

[11] Patent Number: 6,002,186
[45] Date of Patent: Dec. 14, 1999

[54] ELECTRIC STEPPER MOTOR HAVING A CYLINDRICAL MAGNETIC ROTOR WITH A PAIR OF CUPS MADE OF MAGNETIC MATERIAL

[75] Inventors: David Coutu, East Hampton, Conn.; Allen Bennett, Vista, Calif.

[73] Assignee: IMS Inc., Malborough, Conn.

[21] Appl. No.: 09/114,403

[22] Filed: Jul. 13, 1998

[51] Int. Cl.$^6$ .................................................. H02K 37/00
[52] U.S. Cl. ......................... 310/49 R; 310/261; 29/598
[58] Field of Search .................................. 310/49 R, 156, 310/40 MM, 261; 29/598, 596

[56] References Cited

U.S. PATENT DOCUMENTS

| | | | |
|---|---|---|---|
| 3,558,941 | 1/1971 | Brebbia et al. | 310/49 R |
| 3,570,117 | 3/1971 | Kitamura et al. | 29/598 |
| 3,689,787 | 9/1972 | Saretzky | 310/266 |
| 4,009,406 | 2/1977 | Inariba | 310/164 |
| 4,035,677 | 7/1977 | Kusayama et al. | 310/42 |
| 4,280,072 | 7/1981 | Gotou et al. | 310/67 R |
| 4,395,815 | 8/1983 | Stanley et al. | 29/598 |
| 4,424,463 | 1/1984 | Musil | 310/49 R |
| 4,841,186 | 6/1989 | Feigel et al. | 310/156 |
| 5,369,324 | 11/1994 | Saether | 310/49 R |
| 5,448,117 | 9/1995 | Elliott | 310/49 R |
| 5,818,138 | 10/1998 | Hill | 310/152 |
| 5,903,079 | 5/1999 | Iwata et al. | 310/156 |

FOREIGN PATENT DOCUMENTS 4-33559  2/1992  Japan .

*Primary Examiner*—Nestor Ramirez
*Assistant Examiner*—Joseph Waks

[57] ABSTRACT

An electric stepper motor includes a thru-hole, a rotor and a stator. The rotor consists of a pair of hollow magnetic metal flange-shaped laminations arranged within a hollow magnetic sleeve. The motor can be field-converted from rotary to lineal translation by attachment of a threaded nut to the motor shaft mounting face. The thru-hole allows use with a chamber and provides transport of hardware and elements into the chamber.

5 Claims, 7 Drawing Sheets

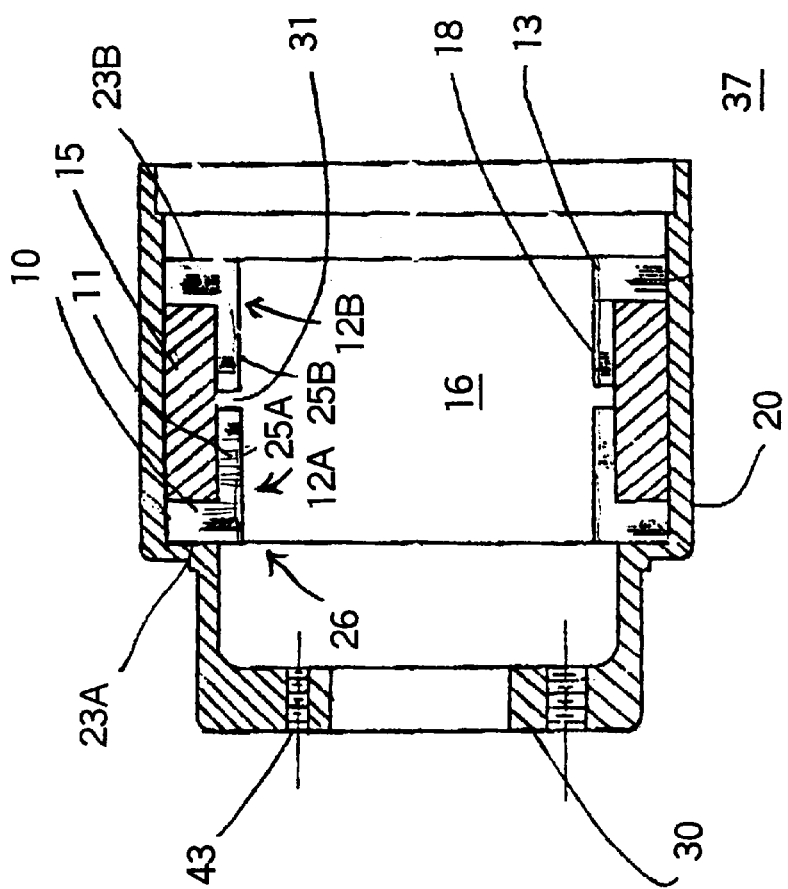
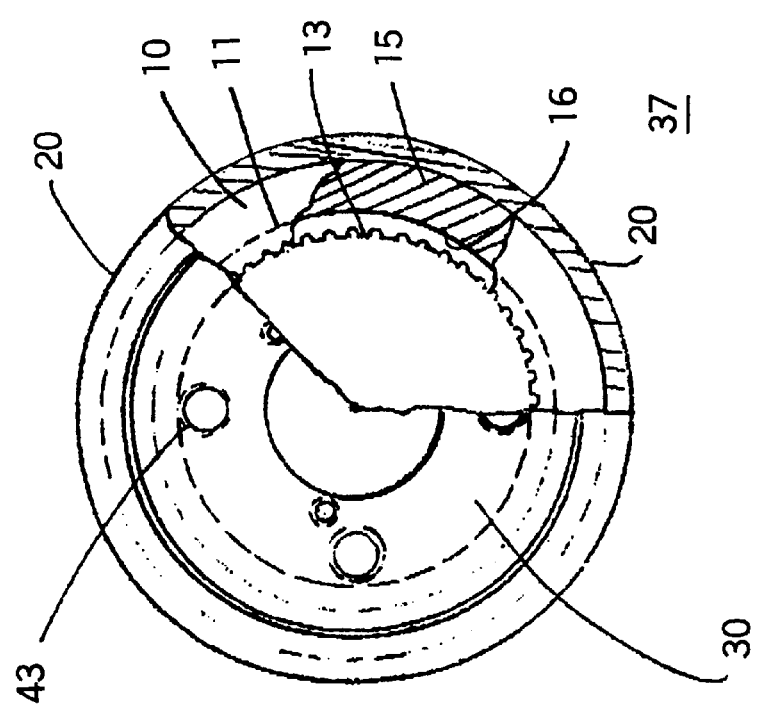
FIG. 5B
FIG. 5A

ELECTRIC STEPPER MOTOR HAVING A CYLINDRICAL MAGNETIC ROTOR WITH A PAIR OF CUPS MADE OF MAGNETIC MATERIAL

BACKGROUND OF THE INVENTION (IMS-1)

There exists a need in motion control applications for the use of step motors as through-hole motors in semiconductor, manufacturing and medical processes that use light emitted by lasers, radar positioning pedestals, and environmentally controlled chambers. Current step motor designs do not easily adapt to such through motor applications without substantial modification.

One example of a motor having an internal opening is found in U.S. Pat. No. 4,646,689 entitled "Engine Intake Passage Length Varying Device" wherein a cylindrical rotor is mounted co-axially with a hollow chamber that contains the air filter of an automotive engine.

U.S. Pat. No. 4,280,072 entitled "Rotating Electric Machine" and U.S. Pat. No. 5,369,324 entitled "Electric Stepper Motor" both describe highly efficient rotor and stator configurations to provide enhanced motor torque.

The state-of-the-art stepper motor designs do not readily allow motors to be stacked end-to-end for multi-axis motion nor allow passage of electric wires or air passage through the center of the motors. Such motors do not readily allow field conversion from a rotary to lineal actuator without substantial modification to the mounting structure.

One purpose of the invention is to describe a stepper motor having means for passage of wires and the like through the center of the motor along with improved motor torque efficiency. The motor includes means for conversion from rotary to lineal actuation with only minor modification to the motor mounting structure.

SUMMARY OF THE INVENTION

An electric stepper motor includes a thru-hole, a rotor and a stator. The stator is internally arranged within the rotor assembly and the rotor assembly consists of a permanent magnet with two rotor cups. The motor can be field-converted from rotary to lineal translation by attachment of a threaded nut to the motor shaft mounting face. The thru-hole allows use with a chamber and provides transport of hardware and elements into the chamber.

BRIEF DESCRIPTION OF THE DRAWINGS

FIG. 5A is a front sectional view side view of the rotor shaft assembly within the motor of FIG. 1 in partial section;

FIG. 5B is a side sectional view side view of the rotor shaft assembly of FIG. 5A;

DESCRIPTION OF THE PREFERRED EMBODIMENT

Figure 1:
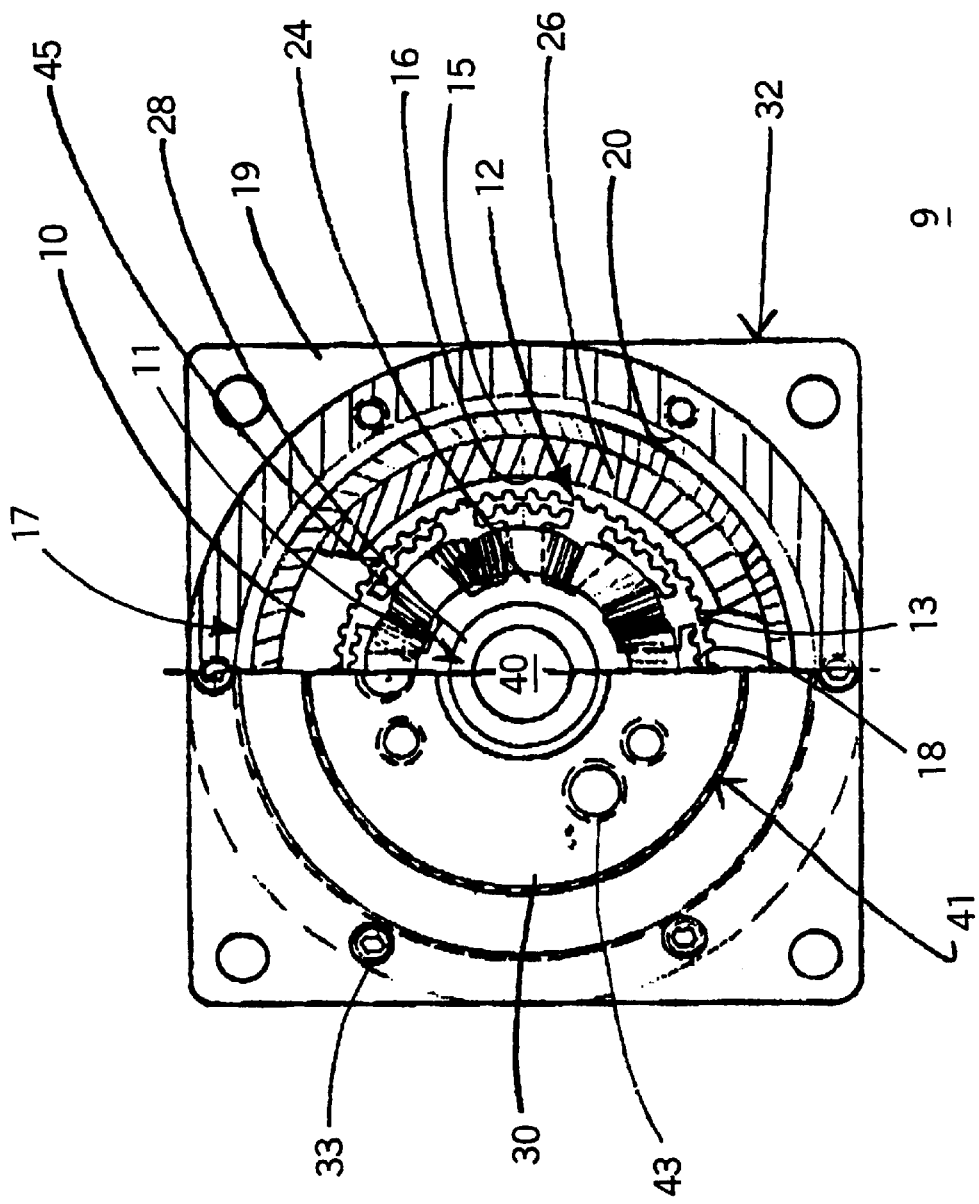
FIG. 1 is a front sectional view of the motor according to the invention depicting the rotor cup teeth and stator teeth.
Figure 2:
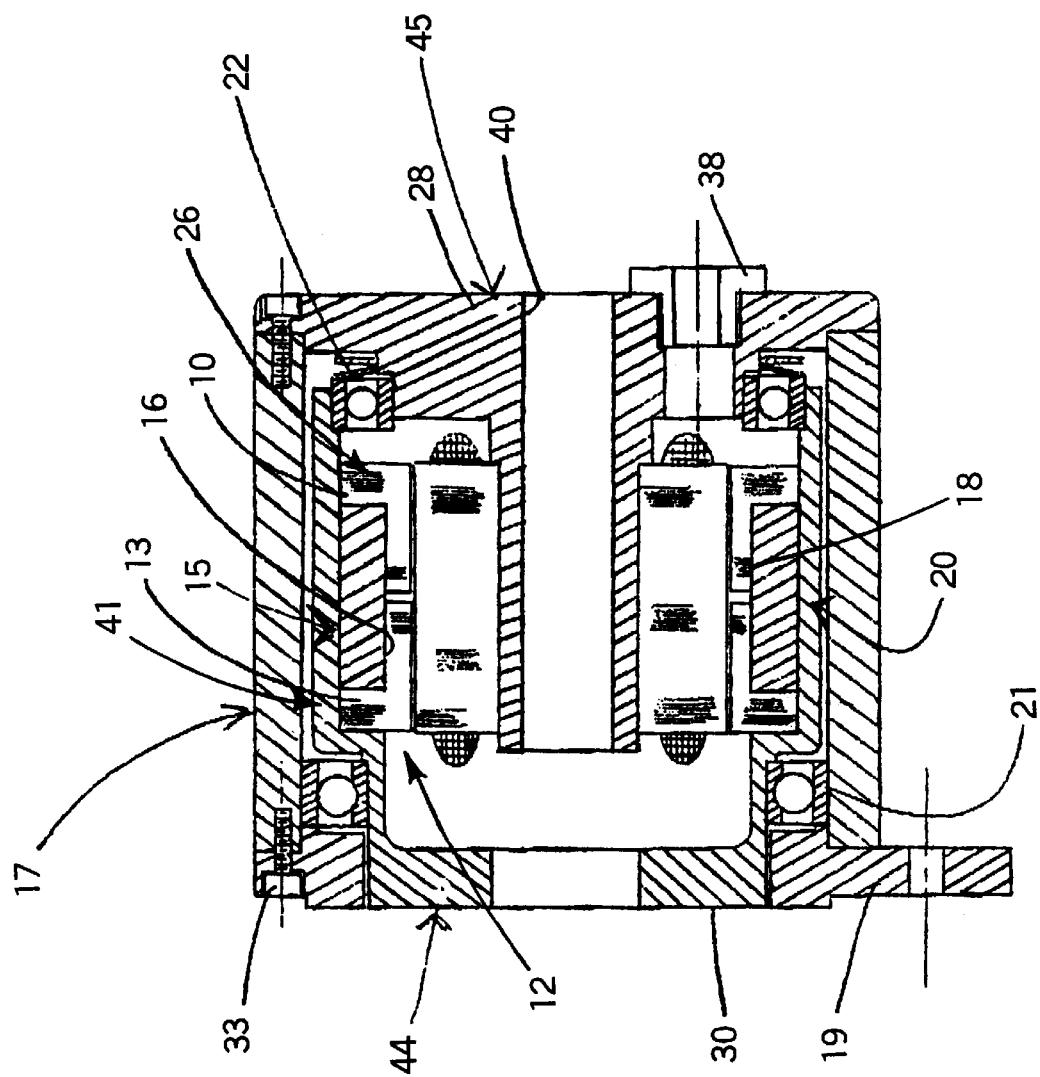
FIG. 2 is a side sectional view of the motor of FIG. 1 depicting the rotary and stationary components.

As shown in FIGS. 1 and 2, the stepper motor 9 includes a motor assembly 17 consisting of a rotor assembly 41 having outside and inside laminations 10,11, arranged around a rotor cup 12 defining rotor cup outer teeth 13 within the rotor cup-magnet assembly 26. The rotor assembly 41 rotates within the permanent magnet 15 defining a permanent magnet inside diameter 16 arranged between the rotor cup outer teeth 13, the rotor cup magnet assembly 26 and the stator 24. The magnet assembly 26 rotationally operates in the manner similar to that described within U.S. Pat. No. 5,448,117 entitled "Stepper Motor" whereby the rotary components, generally depicted at 44, rotate within the stationary components, generally depicted at 45 as shown in FIG. 2. In accordance with the invention, a thru-hole 40 extends concentrically through the shaft housing 20, between the front shaft mounting face 30 and the end cap mounting post 28 to provide for the transfer of fluids or the passage of electric cables and the like without interfering with the rotation of the rotor assembly 41. The rotary components 44 and stationary components 45 are contained within the motor housing 32 which consist of the front mounting flange 19, front ball bearings 21 and rear ball bearings 22 and the entire motor assembly 17 is assembled together by means of housing screws 33, bolts 43 and grommets 38 as indicated.

Figure 3:
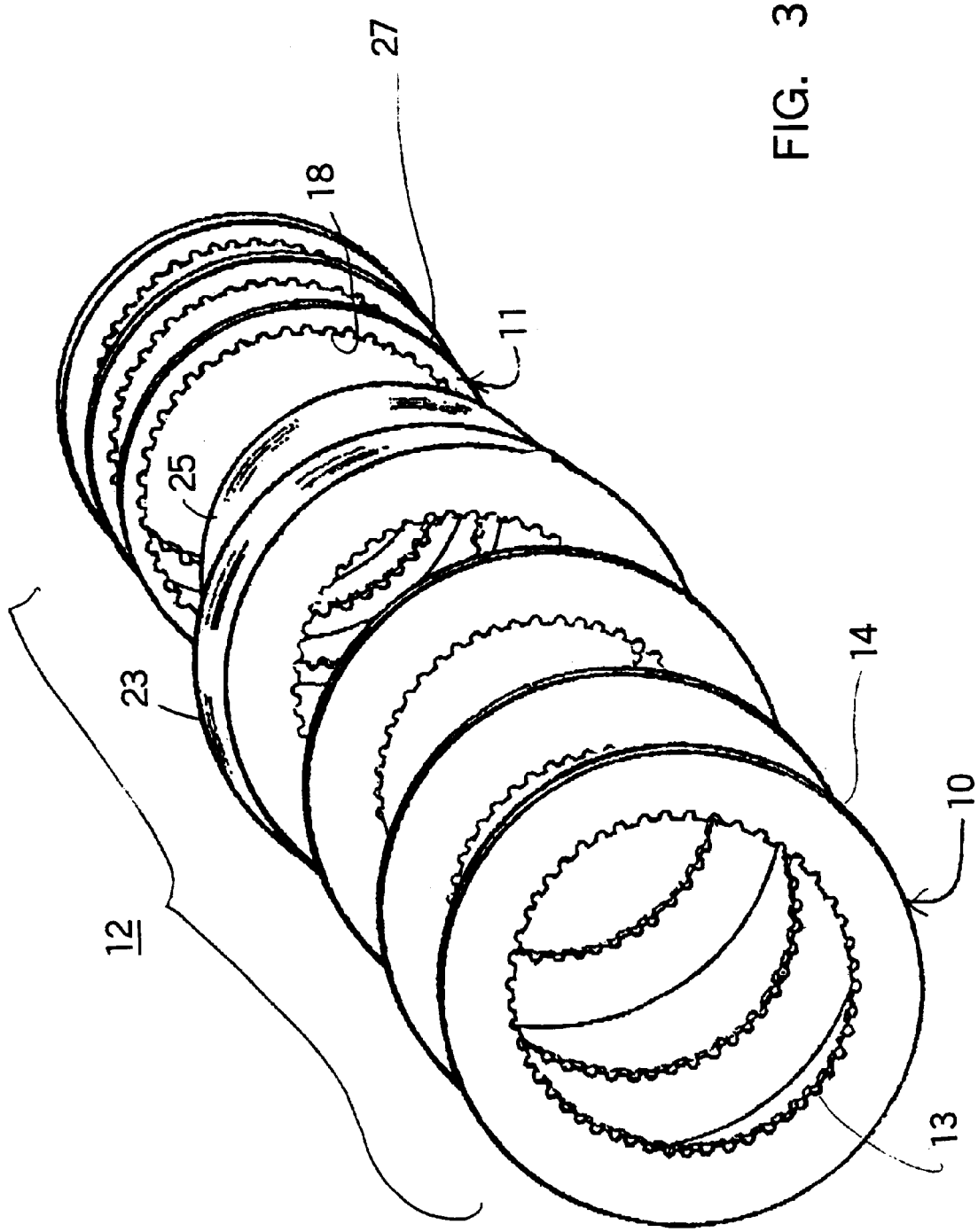
FIG. 3 is an exploded front perspective view of the sequentially stacked rotor laminations contained within the motor of FIG. 1.
Figure 4:
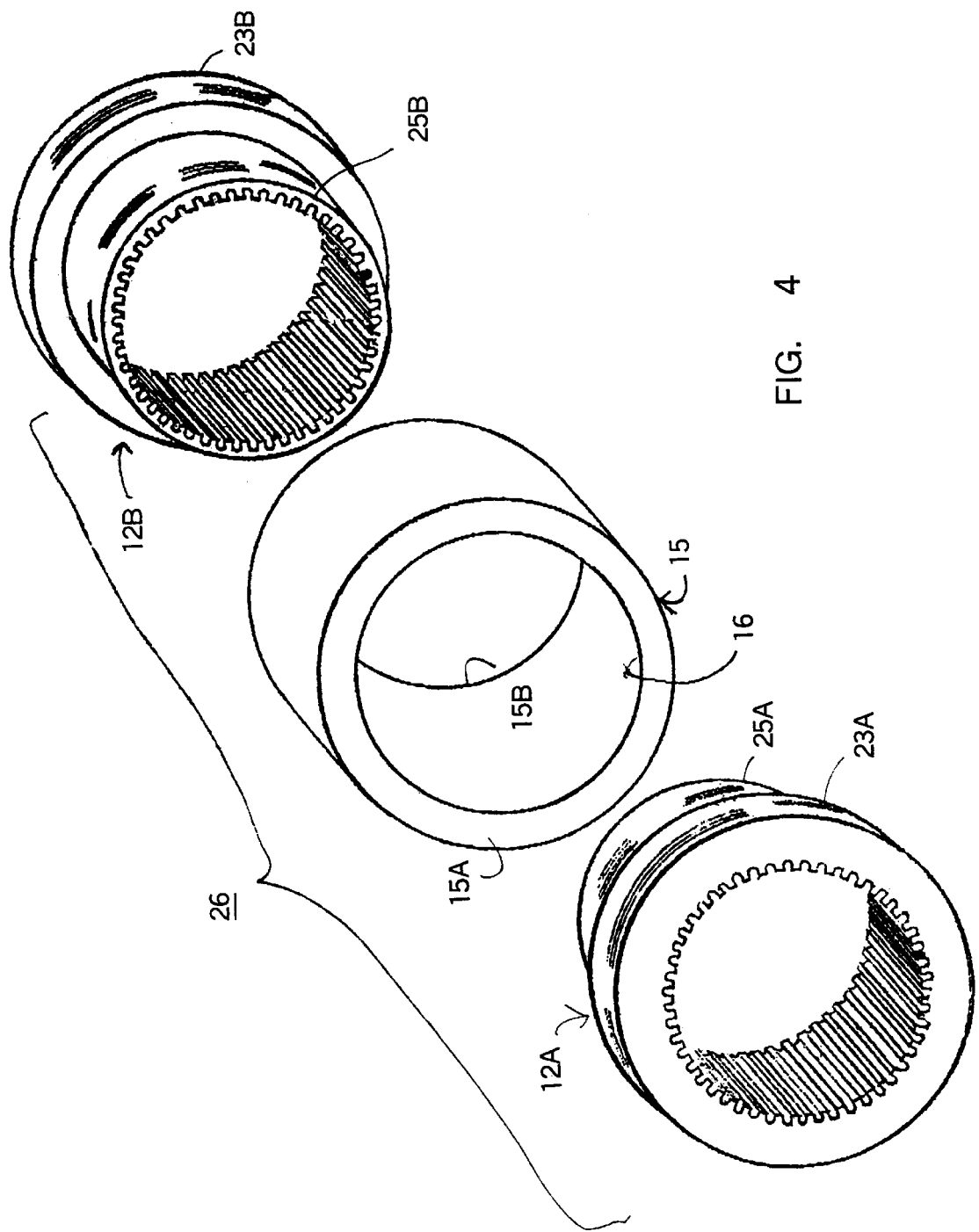
FIG. 4 is an exploded top perspective view of the magnet within the motor of FIG. 1 with the rotor cups in isometric projection.

The assembly of the rotor cup 12 within the motor 9 is best seen by now referring jointly to FIGS. 3 and 4 wherein the outer motor laminations 10 are in the form of thin outer rotor discs 14 of magnetic metal defining a plurality of outer rotor teeth 13 formed on the inner perimeter thereof. The outer rotor discs 14 are cemented together to form a rotor flange as depicted at 23. The inner motor laminations 11 are in the form of thin inner rotor discs 27 of similar magnetic metal defining a plurality of inner rotor teeth 18 formed on the inner perimeter. The inner rotor discs 27 are cemented together to form a rotor stem 25 that is cemented to the to the rotor flange 23 to complete the rotor cup 12.

A pair of rotor cups 12A, 12B as shown in FIG. 4 are arranged on opposite ends of the cylindrical permanent magnet 15, defining a permanent magnet aperture 16. The stem 25A of the rotor cup 12A is inserted within one end of the permanent magnet aperture 16 such that the underside of the flange 23A abuts against the outer perimeter of the permanent magnet as depicted at 15A. The stem 25B of the rotor cup 12B is inserted within the opposite end of the permanent magnet aperture 16 such that the underside of the flange 23B abuts against the outer perimeter of the permanent magnet as depicted at 15B to complete the rotor cup magnet assembly 26.

The stepper motor subassembly 37 is shown in FIGS. 5A and 5B with the rotor cups 25A, 25B comprising the rotor cup magnet assembly within the inner diameter 16 of the permanent magnet 15 such that a gap 31 is defined between the ends of the stems 25A, 25B extending from the flanges 23A, 23B described earlier. The outer motor laminations 10 are co-planar with the corresponding inner rotor laminations 11 and the corresponding inner rotor teeth 18 align with the corresponding outer rotor teeth 13. The inner rotor teeth and the inner rotor teeth having a predetermined tooth pitch for optimum rotor torque and the gap 31 is set at ½ the tooth pitch for motor positional accuracy. The stepper motor subassembly 37 is positioned within the shaft housing 20 with the apertures 43 within the shaft mounting face arranged for completing the stepper motor 9 as now shown in FIG. 6.

Figure 6:
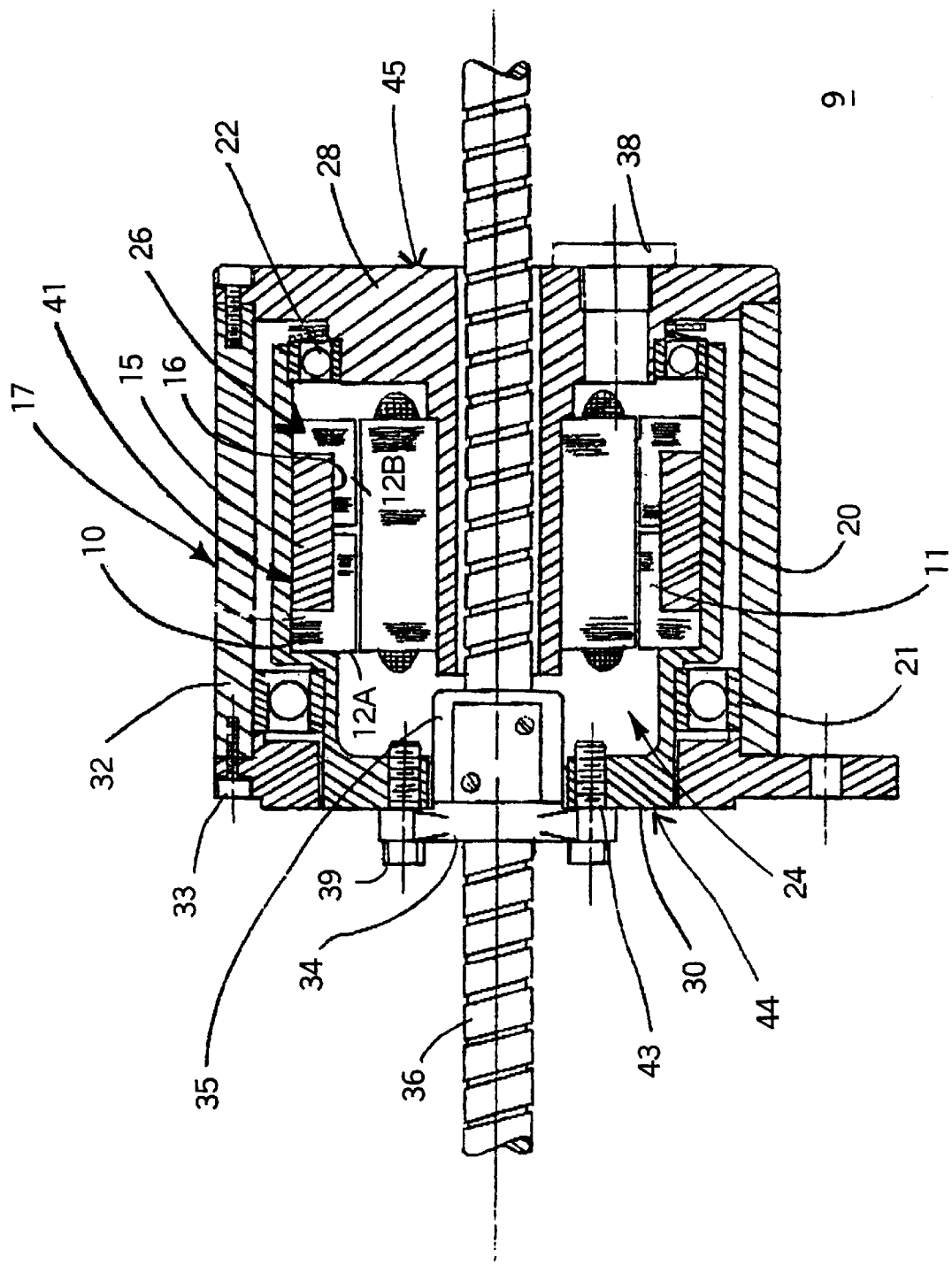
FIG. 6 is a side sectional view the motor of FIG. 2 including a threaded nut attached to the shaft mounting face.

The complete stepper motor 9 with the motor assembly 17, rotor assembly 41, permanent magnet 15 contained within the motor housing 32 shown in FIG. 6. The outer and inner ball bearings 21, 22 are positioned at the ends of the motor shaft housing 20 the stator assembly 24 is arranged under the rotor cups 12A, 12B. The step-shaped stationary component 45 extends within the permanent magnet inside diameter 16 at one end and terminates at an end cap mounting post 28 at the opposite end outer rotor laminations 10, and inner rotor laminations 11 within the rotor cup magnet assembly 26 of the rotary component 44 are aligned within the permanent magnet aperture 16. In the embodiment depicted in FIG. 6, a threaded shaft 36 extends through the permanent magnet aperture 16 and is supported on the shaft mounting face 30 by means of the threaded hub 34 including the hub body 35 and threaded apertures 43 that receive the bolts 39. The grommet 38 seals the remainder of the magnet inside diameter 16 from the exterior of the motor assembly 17. As described earlier, the permanent magnet aperture can remain empty of a shaft to allow for the transfer of electric wiring, fluid pipes or circulating fluids.

Figure 7:
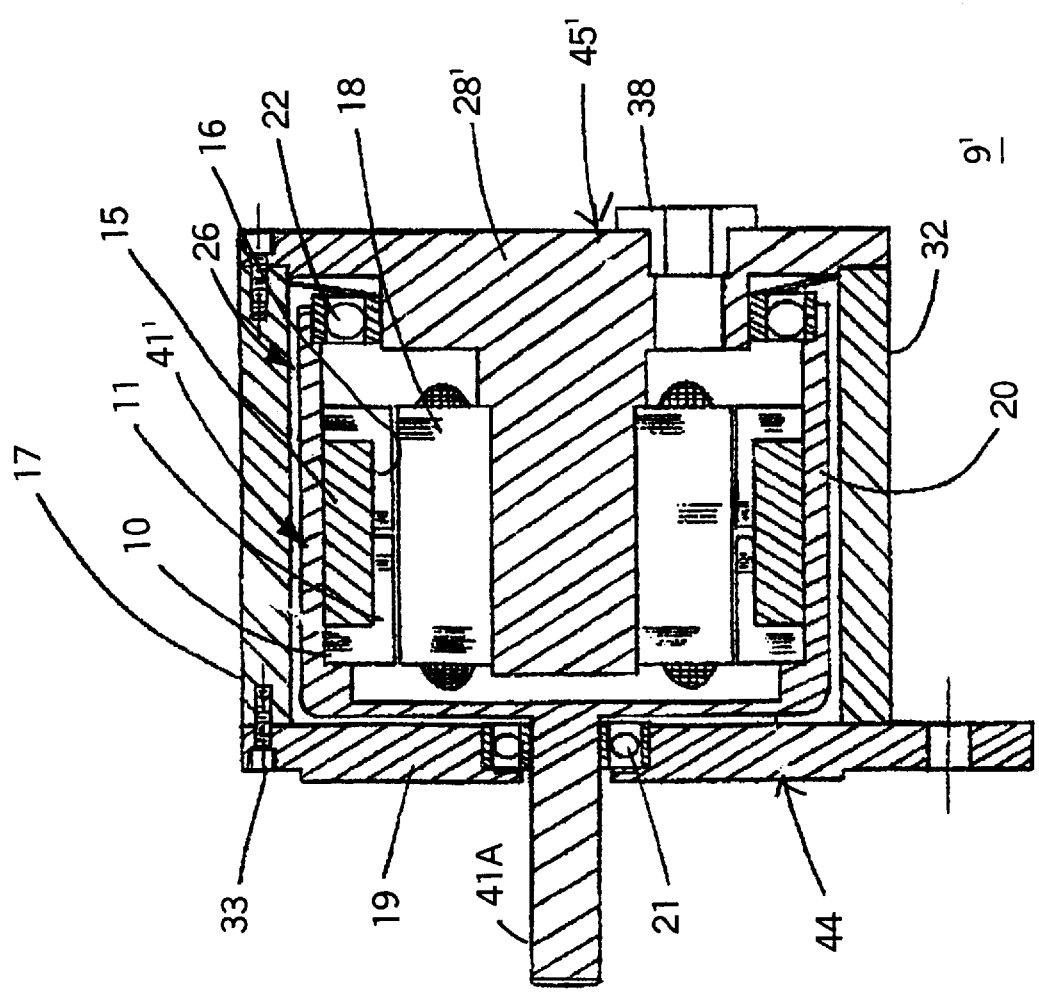
FIG. 7 is a side sectional view the motor of FIG. 6 excluding a thru-hole in the motor.

A further embodiment of a complete motor assembly 9' is shown in FIG. 7 with the similar components indicated as in FIG. 6. In this embodiment, the threaded shaft 36 is eliminated and the end cap 28' of the step-shaped stationary component 45' extends further within the aperture 16 of the permanent magnet 15. The rotor assembly 41' is provided with a front shaft extension as depicted at 41A to provide the motor shaft function. In this arrangement, no motor thru-hole is required.

A stepper motor has herein been described having a two-piece rotor assembly for improved torque efficiency along with an interior thru-hole for field-installation of a shaft, air passage or electric wiring and the like.

What is claimed is:

1. A stepper motor comprising:
   a pair of first and second magnetic metallic rotor assemblies, said first and second rotor assemblies comprising a plurality of hollow circular laminations having a plurality of striations formed on an inner perimeter thereon, a first part of said circular laminations comprise a outer diameter larger than a second part outer diameter thereof, said first part is fastened together to form a flange part and said second part is fastened together to form a stem part said flange part and stem part are fastened together to form said first and said second rotor assemblies;
   a hollow cylindrical sleeve made of magnetic metallic material;
   said first and second rotor assemblies being positioned within said cylindrical sleeve defining a concentric hollow passage extending through said first and second rotor assemblies and said cylindrical sleeve.

2. The stepper motor of claim 1 wherein said stem part of said first rotor assembly is inserted within one end of said cylindrical sleeve and wherein said stem part of said second rotor assembly is inserted within an opposite end thereof.

3. The stepper motor of claim 2 wherein a predetermined gap separates said first and said second stem parts within said cylindrical sleeve.

4. The stepper motor of claim 3 wherein said striations are arranged at a predetermined pitch for optimum motor torque performance.

5. The stepper motor of claim 4 wherein said predetermined gap is set at ½ of said predetermined pitch for optimum motor positioning.

* * * * *